(12) United States Patent
Butler

(10) Patent No.: US 8,138,968 B1
(45) Date of Patent: Mar. 20, 2012

(54) UNATTENDED GROUND SENSOR SYSTEM AND METHODS

(75) Inventor: Gary D. Butler, Starkville, MS (US)

(73) Assignee: Camgian Microsystems Corp., Starkville, MS (US)

( * ) Notice: Subject to any disclaimer, the term of this patent is extended or adjusted under 35 U.S.C. 154(b) by 0 days.

(21) Appl. No.: 12/694,137

(22) Filed: Jan. 26, 2010

(51) Int. Cl.
*G01S 13/08* (2006.01)

(52) U.S. Cl. .......... 342/139; 342/118; 342/147; 342/57; 342/95

(58) Field of Classification Search .......... 342/57, 342/95, 118, 139, 147
See application file for complete search history.

(56) References Cited

U.S. PATENT DOCUMENTS

| 4,635,062 | A  | * | 1/1987  | Bierig et al.     | 342/372 |
|-----------|----|---|---------|-------------------|---------|
| 5,086,302 | A  | * | 2/1992  | Miller            | 342/373 |
| 5,659,320 | A  | * | 8/1997  | Pouit             | 342/115 |
| 2002/0118137 | A1 | * | 8/2002  | Halsema et al.    | 343/705 |
| 2002/0196178 | A1 | * | 12/2002 | Beard             | 342/42  |
| 2007/0080863 | A1 | * | 4/2007  | Glockler et al.   | 342/463 |
| 2008/0186402 | A1 | * | 8/2008  | Living            | 348/452 |
| 2010/0135587 | A1 | * | 6/2010  | Watanabe et al.   | 382/236 |
| 2010/0201561 | A1 | * | 8/2010  | Dhondt et al.     | 342/27  |
| 2011/0043405 | A1 | * | 2/2011  | Reichenbach et al. | 342/368 |
| 2011/0050461 | A1 | * | 3/2011  | Pixley et al.     | 340/933 |

* cited by examiner

*Primary Examiner* — Timothy A Brainard
(74) *Attorney, Agent, or Firm* — Venable, Campillo, Logan & Meaney, P.C.

(57) ABSTRACT

A High Performance Unattended Ground Sensor (HiPer-UGS) system and methods comprising low-power fully functional and independent radar-nodes that communicate directly with a remote radar information gathering or relay point using a long distance communications transceiver co-located in the radar-node.

3 Claims, 3 Drawing Sheets

(c)　　　　　　　　　　　(d)

UNATTENDED GROUND SENSOR SYSTEM AND METHODS

GOVERNMENT RIGHTS

This invention was made with Government support under SBAHQ-06-I-0081 awarded by the U.S. Small Business Administration. The Government has certain rights in the invention.

BACKGROUND OF THE INVENTION

Today, the development of low-power, long-endurance Unattended Ground Sensor (UGS) technologies is critical in supporting persistent sensing missions for military and homeland security related operations. However, the successful large-scale deployment of UGS systems for these applications will only become feasible with significant technical advancements in key areas related to sensing performance, power consumption and communications. Below I address these issues as they relate to current UGS technologies.

To reduce the workload on users and improve the operational utility of sensing missions, UGS systems are required to achieve very high probabilities of detection (Pd) and low probabilities of false alarms (Pfa) against human and vehicle targets in very difficult sensing environments. These environments include foliage, urban, and mountainous terrain. Conventional UGS technologies that leverage acoustic and seismic approaches to sensing are plagued with high false alarm rates, poor classification performance, small detection ranges and an inability to generate high quality target information, such as head count, position localization, or tracks.

Sensor systems deployed in remote regions will have no access to electrical power sources; therefore, new advancements in power management for UGS are critical to achieving the required operational endurance that is needed to meet user needs. These advancements include the ability to: (1) perform precision power cycling of electronic systems; (2) scavenge and effectively store available energy from the environment; and (3) significantly reduce system power consumption requirements through novel Application Specific Integrated Circuit (ASIC) design approaches.

Low-latency, robust communication of target information from the sensor to the analyst is critical for providing actionable intelligence and, thus, an effective response to target activities. Robust UGS communications and networking have proven to be a significant challenge because of a host of issues associated with near-ground communications where propagation losses are significant and variations in terrain elevation can result in the loss of node-to-node communication links. Because most sensor network architectures are ad hoc, directional antennas are impractical and, thus, achieving and maintaining reasonable communications links require significant transmit power. These key communication issues significantly limit node-to-node spacing, reduce node-to-node data rates, increase power consumption and complicate node deployment scenarios as ensuring adequate node-to-node spacing in highly variable propagation environments becomes difficult with both airborne and hand-emplacement scenarios.

Moreover, distributed, multi-hop sensor network architectures that are used in most networked UGS systems collect information at the node-level and relay it through the network to an external relay device for exfiltration. This network and relay architecture is inherently latent as the flow of information from node-to-node through the is network is dependent on the transmit and receive schedule implemented within the Media Access Control (MAC) protocols. With UGS networks comprising large numbers of nodes with highly constrained power consumption requirements, network latencies can grow to significant time scales.

Achieving the persistent sensing needs of military and homeland security missions requires significant advancements in sensing performance, operational endurance and communications reliability over today's UGS technologies. Below, we describe a next generation UGS technology, termed High Performance (HiPer) UGS, whose design provides a promising new approach to ground sensing and, thus, meets many of the challenging and critical requirements associated with military and homeland security sensing missions.

SUMMARY OF THE INVENTION

The invention comprises a High Performance Unattended Ground Sensor (HiPer-UGS) system concept that supports critical intelligence, surveillance and reconnaissance missions of US national defense, intelligence and security organizations. These missions include: (1) wide area surveillance of ground targets; (2) border security and critical infrastructure protection; and (3) persistent, globe capable surveillance of critical areas of interest. The UGS System provides the capability for collecting actionable intelligence in the field for periods of months to years, relaying critical intelligence over Satellite Communications (SATCOM) and displaying that information to users world-wide in near real-time. Moreover, HiPer-UGS enables robust perimeter security and intrusion detection capabilities for the commercial security market. Given the objectives above, the invention is summarized below.

The present invention comprises a High Performance Unattended Ground Sensor (HiPer-UGS) system and methods, and includes low-power fully functional and independent radar-nodes that communicate directly with a remote radar information gathering or relay point using a long distance communications transceiver co-located in the radar-node. The radar-nodes operate in the field or location of the surveillance target to beam radar signals, capture and process reflected radar target information, and generate radar target reports that are transmitted by the long distance communications transceiver to the remote radar information gathering or relay point. For the purpose of the description, a remote radar information gathering or relay point is a location strategically removed from the surveillance target and from which radar target reports can be exfiltrated and accessed in ordinary manners. Thus, most often, the remote intelligence gathering or relay point is a communications satellite (COMSAT) located strategically above the surveillance target.

Each radar-node includes a low-power, pulse compression, phased array RADAR transceiver and radar signal processing capabilities for generating precision target reports, including position localization, classification and tracks, and an in-node communications transceiver, such as a SATCOM transceiver, for exfiltrating target reports to a satellite for access by intelligence and military analysts world-wide. The in-node radar transceiver is in communication with and electrically coupled to a low-power Central Processing Unit or microcontroller designed for optimal power management during radar operations and in-node signal processing of received radar target information. The in-node communications transceiver comprises a low-power long distance two-way communications transceiver that communicates directly or links with a communications transceiver located at the remote information gathering or relay point, such as a C2 satellite system.

DESCRIPTION OF PREFERRED EMBODIMENTS

Figure 1:
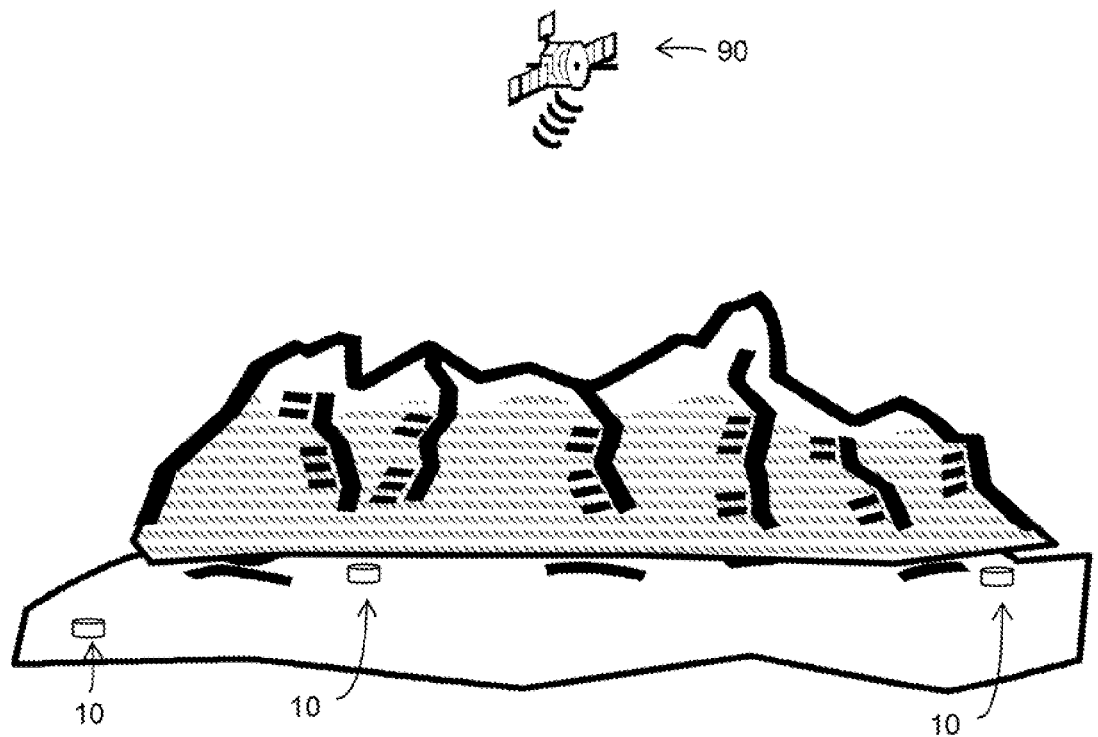
FIG. 1 illustrates a perspective view of the UGS system concept, which includes a plurality of radar-nodes 10 deployed in the field or a mountainous terrain in communication directly with a satellite 90.

The HiPer-UGS system concept is illustrated in FIG. 1 and comprises a plurality of independent radar-nodes 10 capable of communicating directly with a satellite 90 based communications location. At a system level, direct and independent communications from each radar-node 10 to a strategically located remote communications location is a primary advantage of the present invention. Moreover, a system based on the invention has at least one, but preferably a plurality of, radar-node(s) 10. Radar-node 10 components include a Central Processing Unit (CPU) 80 or microcontroller, a radar transceiver 70, an electronically steerable phased array antenna 20, a communications transceiver 90 and compatible antenna 40, power management circuitry 100, and one or more power sources such as a photovoltaic cell 30 or battery 50. The CPU 80 controls operation of the radar transceiver 70, and communications transceiver 90, as well as performing signal processing of radar signals received by the radar-node 10 to generate radar target information or reports.

Radar-node 10 processing or filtering of radar target information benefits each radar-node 10 and the UGS system as a whole. First, power is conserved within each radar-node 10. Particularly, reflected radar target information received by the radar-node antenna 20 is processed and qualified by software program operating the radar-node CPU 80 to determine that radar target information meets minimum or threshold requirements for a radar target report to be transmitted from the radar-node 10 to a satellite 90 or other intelligence, gathering destination. The CPU 80 enables the communications transceiver 90 to transmit target information that meets or exceeds threshold requirements ("radar target reports), whereas radar target information that does not meet threshold requirements may be deprioritized for delayed transmission by the communications transceiver 90 or even withheld. System power is conserved not only because the communications transceiver 90 does not transmit non-qualifying radar target information, but also because the radar-node CPU 80 may keep the communications transceiver 90 in a low-power mode until it determines that processed radar target information meets threshold requirements (i.e. radar target reports).

The HiPer-UGS system also conserves system resources outside of each radar-node 10. The UGS system conserves systems resources on the satellite 90 end since radar target reports are prioritized for transmission and for ultimate evaluation by intelligence personal. System resources are not consumed receiving and analyzing low priority transmissions of uninformative or benign radar target information from one or more radar-nodes 10. Moreover, because each radar-node 10 is capable of communication directly with the satellite 90, surveillance personnel can communicate directly with each radar-node 10 to override an in-node operating CPU 80 software program or radar surveillance protocol to focus system resources on particular areas of interest or adjust or customize the operating protocol in each radar-node 10.

The in-node generation of radar target information comprises generation, transmission, and steering of radar signal or beam as well as the reception of the returned radar signal having a radar target characteristic or profile. Generation and reception of the radar signal in each radar-node is by the in-node radar transceiver 70. The radar transceiver 70 is coupled electrically to an electrically steerable phased array antenna 20 and a Central Processing Unit (CPU) 80 as well as passive circuitry and power circuits. The CPU 80 operates a computer program and controls the radar transceiver 70 to generate and steer a Linear Frequency Modulated (LFM) "chirped" waveform emitted by the phased array antenna 20. Radar beam steering employs time delay steering for constructive and destructive interference of radar signals emitted by the plurality of elements of the phased array antenna 20. Time delay steering and the array antenna 20 enables coherent beam forming providing extended target detection ranges and node-level target tracking.

Figure 3:
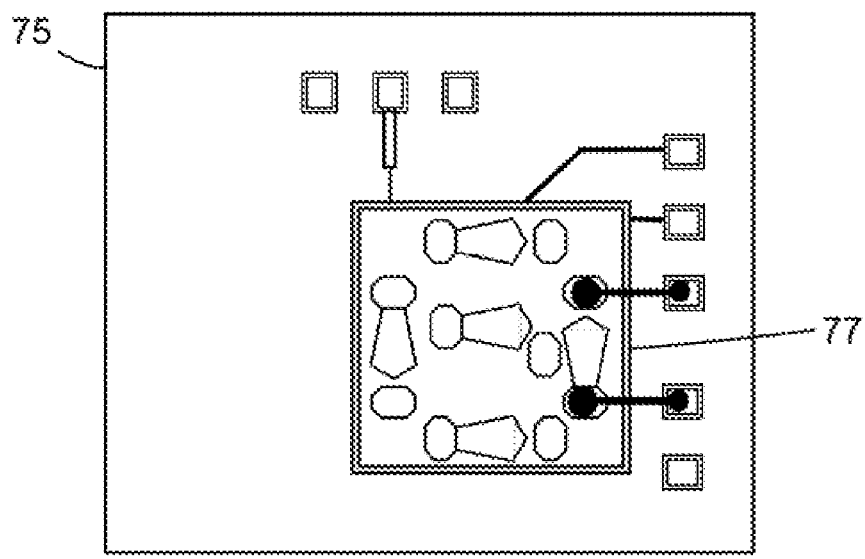
FIG. 3 illustrates a Micro-Electronic-Mechanical System (MEMS) ceramic disc resonators 77 chip electrically coupled by wires to an CMOS oscillator circuit 75.

A preferred radar transceiver 70 design for low-power HiPer-UGS operations includes a highly integrated RF electronics architecture implemented in a System on a Chip (SoC) ASIC. The Radar SoC ASIC design comprises a low-power, pulse compression radar transceiver 70 interfaced with a low-power CPU 80 or microcontroller developed to optimize power management for radar operations and in-node processing. A preferred RF design for minimum energy radar includes a combination of Micro-Electro-Mechanical System (MEMS) components and Complimentary Metal-Oxide Semiconductor (CMOS) technologies providing a highly integrated, low-power RADAR SoC. MEMS resonators operating at RF frequencies enable high quality factors (>1000) provided by the mechanical resonance and, thus, support the development of techniques to shift the burden of signal processing onto passive MEMS structures instead of power hungry active circuitry. An example of this is shown in FIG. 3, which illustrates a 1 $mm^2$ MEMS chip 77 mounted on the CMOS oscillator circuit 75. Wire bonds electrically couple the MEMS chip 77 and the CMOS integrated circuit 75.

A chirped LFM waveform is a preferred approach and possesses many attractive features for the HiPer-UGS system. Specifically, because of its large bandwidth and inherently high spatial resolution, the chirped waveform satisfies HiPer-UGS radar signal processing requirements (described below) for detecting, classifying and tracking targets in dense, cluttered environments. These large bandwidth signals have demonstrated the ability to effectively provide spatial and temporal resolution of reflected radar target signals and, thus, enable robust target detection and low false alarm performance in difficult environments, such as foliage, urban and mountainous terrain, using standard radar signal processing techniques. For the HiPer-UGS system, the minimum requirement for radar range resolution is matched to the range extent of the human target. Assuming this to be approximately 0.3 m, the preferred minimum bandwidth requirement of the HiPer-UGS radar waveform is:

$$BW = \frac{c}{(2)(R_r)} = 500 \text{ MHz} \quad (1)$$

where c is the speed of light and $R_r$ is the required radar range resolution.

Figure 4:
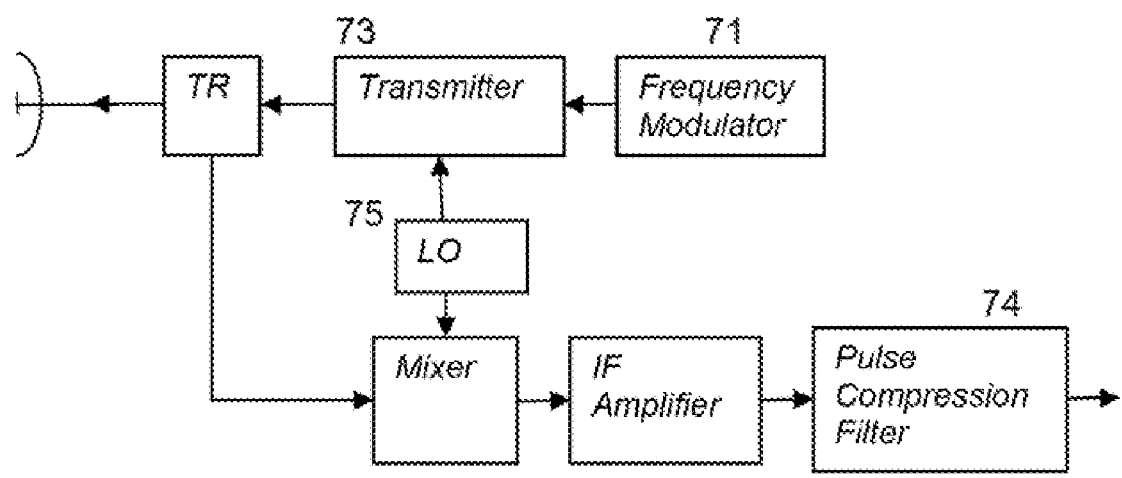
FIG. 4 illustrates a simplified block diagram of a radar-transceiver 70 for creating and receiving a "chirped" Linear Frequency Modulated (LFM) radar waveform.
Figure 5:
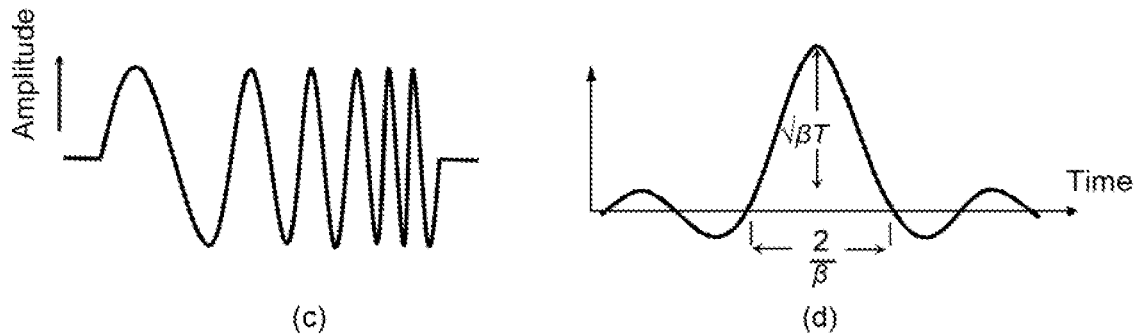
FIG. 5 illustrates a chirped LFM radar waveform and a pulse compressed chirped LFM radar waveform.

A block diagram of LFM pulse compression radar transceiver 70 can be seen in FIG. 4. As seen in the figure, the key elements to the LFM pulse compression radar architecture include a frequency modulated transmitter 710 and a pulse compression filter 720. The transmitter 730 generates a frequency-modulated pulse comprising a constant amplitude and frequency that increases linearly from $f_1$ to $f_2$ over the duration of the waveform. Pulse compression using either an analog or digital filter 740 in the receiver produces a pulse with a width of 1/BW, where $BW=f_2-f_1$. A diagram of an uncompressed and compressed pulsed waveform is given in FIG. 5.

Figure 2:
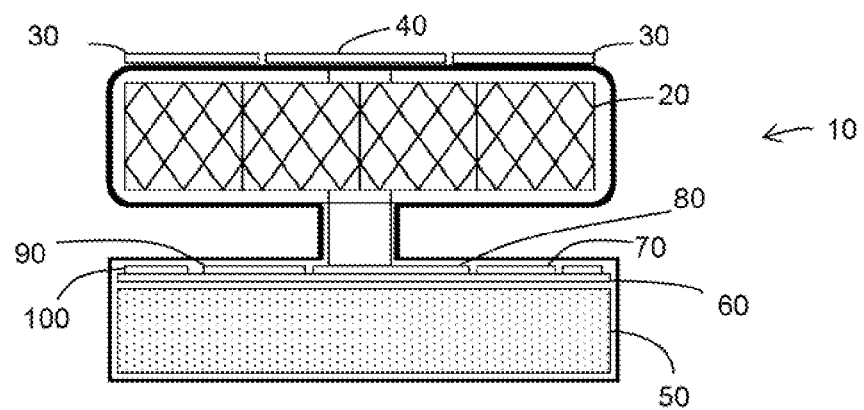
FIG. 2 illustrates a side view of a radar-node 10, which shows the relative position of the RF electronic components located on a circuit board and in relation to the phased array radar antenna 20 located circumferentially around or about the perimeter of the radar-node 10 surface that is substantially perpendicular to the ground, and photovoltaic cells 30 and a satellite communications antenna 40 oriented substantially skyward or predominantly perpendicularly to the phased array radar antenna 20 elements.

The HiPer-UGS system concept comprises a number of unique sensing, communications and low-power design features. Specifically, these include a low-power, pulse compression phased array RADAR for generating precision target reports, including position localization, classification and tracks, and an in-node SATCOM communications transceiver 90 for exfiltrating target reports directly to intelligence and military analysts world-wide. A diagram conceptually illustrating a HiPer-UGS node can be seen in FIG. 2. Each radar-node 10 comprises mechanical construction or architecture optimized for system performance and power conservation. FIG. 2 illustrates a side view of the preferred radar-node 10. The novel purpose and concept of the invention dictates the construction of the chassis or radar-node 10 body and the placement and orientation of the physical and electrical components of which the radar node 10 is comprised.

The HiPer-UGS radar node 10 incorporates a low power satellite transceiver 90 that provides direct, two-way communication of target data between the radar-node 10 deployed in a remote location and a C2 system. Commercial satellite transceivers are compatible and support the communication of both Global Positioning System (GPS) location and other formatted data through satellite networks (e.g. Globalstar) to and from most locations world-wide. Such networks support access to data through the Internet, which in this case is leveraged as the medium for delivery of target information to the end user. For the HiPer-UGS hardware, the satellite transceiver 90 is tightly integrated with the radar SoC architecture and supports low-power transmit, sleep and standby modes of operation. During HiPer-UGS radar operations, the device remains in sleep mode until a valid radar target report is generated and ready for exfiltration. Radar target reports are formatted and encrypted for transmission and comprise time-stamped target detection, classification and tracking information generated by the onboard radar signal processing algorithms. When target reports are available, a software command from the SoC's microcontroller initializes the transceiver, which transmits the report and return to a sleep mode. The HiPer-UGS satellite transceiver preferably operates in the 1610 MHz-1620 MHz band and interfaces with an integrated L-band antenna that is mounted with maximum skyward visibility.

Figure 6:
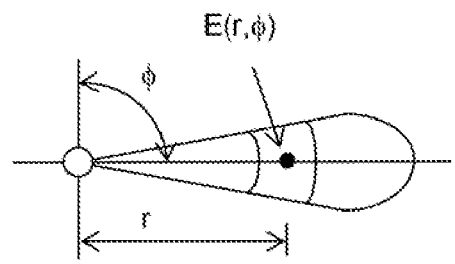
FIG. 6 illustrates a diagram of a radar signal emitted from the phased array radar antenna 20.
Figure 7:
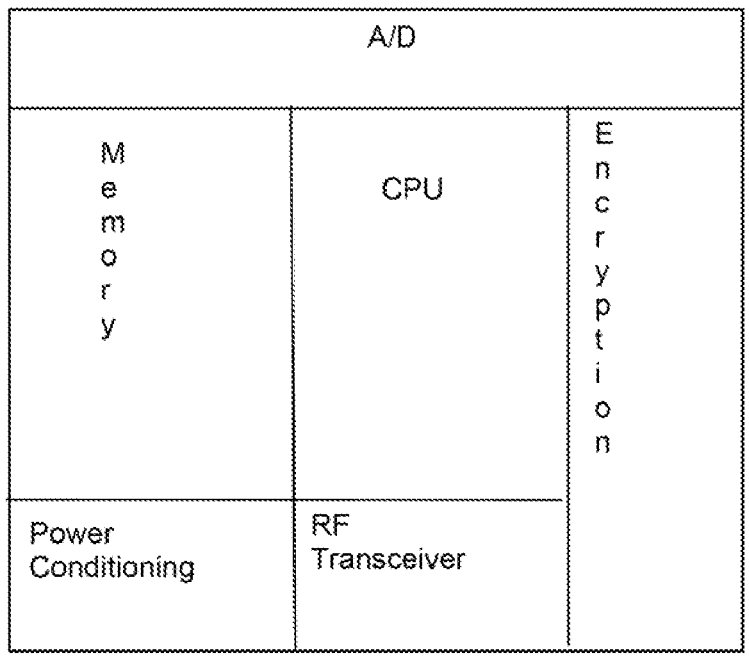
FIG. 7 illustrates a block diagram of a clockless integrated microcontroller design preferred for radar-node 10 designs.

To optimize UGS system performance while reducing power consumption, size and cost, the HiPer-UGS system leverages a custom ASIC design achieving high levels of integration among many of the system's key electronic components. To further maximize component integration levels, the HiPer-UGS's radar ASIC design leverages a patented NULL Convention Logic™ (NCLT™) clockless technology from Camgian Microsystems along with a 180 nm Silicon-on-Insulator CMOS process from American Semiconductor that provides significant benefits in power management, reduced noise and crosstalk and system performance. Such clockless, data-driven, and effectively delay insensitive circuits have been demonstrated as a highly effective RF/analog friendly digital "glue" for designing mixed signal SoC ASICs and include a number of highly desirable performance characteristics as illustrated in FIG. 6. The preferred ASIC design based on clockless circuitry includes a CPU 80, an Analog to Digital Converter, Memory, Power condition circuitry 100, and a radar transceiver 70.

A key component of each radar-node 10 is a compact, electronically steerable phased array antenna designed to provide a 360° radar Field of View (FOV) around the radar-node 10. The radar beam from each radar-node 10 scans a beam 360 deg in azimuth, $\phi$, and measures reflected signal energy, E, at ranges, r. The antenna 20 design includes a horizontally oriented cylindrical array of antenna elements controlled either individually or in groups of subarrays by the radar SoC ASIC. A timing circuit in the ASIC provides precision control of the antenna elements to enable coherent beam forming and steering consistent with radar requirements for spatial gain and revisit rates for detecting and tracking human and vehicle targets.

The preferred power supply for the HiPer-UGS node includes an integrated battery and power scavenging system to enable fully persistent operations in the field. The power supply system meets the power requirements for in-node functions and enables operations when environmental energy is not available. Commercially available power scavenging technologies generate an average of 5-10 mW of power output. One candidate for power scavenging technology for the HiPer-UGS node is the Ambient solar energy scavenger available from Ambient Control Systems, Inc of El Cajon Calif. (www.ambientalert.com). This Ambient device harvests energy over wide range of light conditions by use of HEPV solar cells with sun conversion rates of 27-31%. A maximum power point tracking algorithm is used to optimize energy conversion and the power supply stores energy in an ultra capacitor which supports low leakage and long life—providing 500,000 recharge cycles compared with 300-500 recharge cycles for lithium ion batteries. These capacitors will also survive in extreme temperature environments and can provide 10-20 year life.

The HiPer-UGS node includes a number of software modules to support RADAR functionality, power management and C2. The HiPer-UGS system includes real-time monostatic phased array radar signal processing capabilities comprising target detection, classification and tracking algorithms. HiPer-UGS radar detection processing leverages Ground Moving Target Indicator (GMTI) algorithms for suppressing background clutter and generating target range and azimuth information. The use of GMTI is a standard radar signal processing approach and provides robust discrimination between moving targets and stationary clutter. This characteristic of the GMTI approach is highly desirable for HiPer- UGS operations as the system and provides robust detection and false alarm performance in highly cluttered environments such as foliage, urban and mountainous terrain. Conventional approaches to GMTI leverage a doppler frequency shift to identify moving objects in the presence of clutter; however, a time domain filter is utilized as the basis of the HiPer-UGS detection processing algorithm. The pulse-based GMTI filter design is tightly coupled to the operation of the HiPer-UGS radar array and comprises an algorithm for averaging and tracking the signal strength of clutter patches in terms of range-azimuth resolution cells within the radar's FOV (see FIG. 6). This information is maintained in a space-time clutter matrix that is updated and averaged on a scan-to-scan (one 360° sweep of the radar search beam) basis. In conjunction with the maintenance of the clutter matrix, a subtraction algorithm generates updates to a corresponding target matrix that represented the subtracted output of received signal levels on current sweeps (scan matrix) and the clutter matrix. Additionally, a threshold matrix is used to control detection and false alarm probabilities by rejecting values within the target matrix that did not exceed a user-defined threshold. The threshold matrix is designed to adaptively adjust the threshold of the subtracted output to limit the impact of areas within the radar's FOV that contained excessive internal clutter motion and thus pose potential false alarm and tracking problems. The concept of the HiPer-UGS GMTI signaling process is outlined below, where $E_r$ is the received signal strength, $E_c$ is the average clutter signal amplitude, $E_t$ is the residual target signal amplitude, r is monostatic range, $\phi$ is azimuth and t is a threshold setting.

$$\begin{bmatrix} E_r(r_1, \phi_1) & E_r(r_2, \phi_1) & \ldots & E_r(r_N, \phi_1) \\ E_r(r_1, \phi_2) & E_r(r_2, \phi_2) & \ldots & E_r(r_N, \phi_2) \\ \vdots & \vdots & \vdots & \vdots \\ E_r(r_1, \phi_N) & E_r(r_2, \phi_N) & \ldots & E_r(r_N, \phi_N) \end{bmatrix} \text{Scan Matrix} -$$

$$\begin{bmatrix} E_c(r_1, \phi_1) & E_c(r_2, \phi_1) & \ldots & E_c(r_N, \phi_1) \\ E_c(r_1, \phi_2) & E_c(r_2, \phi_2) & \ldots & E_c(r_N, \phi_2) \\ \vdots & \vdots & \vdots & \vdots \\ E_c(r_1, \phi_N) & E_c(r_2, \phi_N) & \ldots & E_c(r_N, \phi_N) \end{bmatrix} \text{Clutter Matrix} -$$

$$\begin{bmatrix} t(r_1, \phi_1) & t(r_2, \phi_1) & \ldots & t(r_N, \phi_1) \\ t(r_1, \phi_2) & t(r_2, \phi_2) & \ldots & t(r_N, \phi_2) \\ \vdots & \vdots & \vdots & \vdots \\ t(r_1, \phi_N) & t(r_2, \phi_N) & \ldots & t(r_N, \phi_N) \end{bmatrix} \text{Threshold Matrix} =$$

$$\begin{bmatrix} E_t(r_1, \phi_1) & E_t(r_2, \phi_1) & \ldots & E_t(r_N, \phi_1) \\ E_t(r_1, \phi_2) & E_t(r_2, \phi_2) & \ldots & E_t(r_N, \phi_2) \\ \vdots & \vdots & \vdots & \vdots \\ E_t(r_1, \phi_N) & E_t(r_2, \phi_N) & \ldots & E_t(r_N, \phi_N) \end{bmatrix} \text{Target Matrix}$$

All energy perceived above the GMTI filter background is processed for target track information. As range and azimuth information generated through the GMTI filter may not represent valid target data (e.g. wind blown clutter), a motion based clutter suppression approach using a position and velocity estimation algorithm is used as an additional processing step to eliminate false detection reports that did not form logical target tracks. A standard approach to target motion estimation is the α-β tracker, which is used for associating new range and azimuth updates to the target matrix with the predicted position and velocity of the target. Using the α-β tracker, present target position and velocity information is calculated using the equations:

$$\bar{x}_n = x_{pn} + \alpha(x_n - x_{pn}) \tag{2}$$

$$\bar{\dot{x}} = \bar{\dot{x}}_{n-l} + \frac{\beta}{T_s}(x_n - x_{pn}) \tag{3}$$

where $x_{pn}$=predicted position of the target at the nth scan, $x_n$=measured position at the nth scan, α=position smoothing parameter, β=velocity smoothing parameters, and $T_s$=time between observations. The predicted position at the n+1 scan is $$\bar{x}_{n+1} = \bar{x}_n + \bar{\dot{x}}_n T_s. \tag{4}$$

Predicted target position information generated by the α-β tracker is compared with the latest updates to target range and azimuth information available in the target matrix. Those matrix values associated with the predicted target position and velocity is stored in a track file from which target reports are created. Criterion such as number of track points or track persistence are used as a metric for generating and communicating a target report.

RADAR classification processing includes feature extraction algorithms based on the LFM waveform that enables robust classification of targets against potential false alerts, such as animals or clutter motion. These algorithms are primarily based on target features, such as RADAR cross section and target motion and the classifier could be in the form of a neural network that has been trained on target data collected during field testing and evaluation.

In addition to signal processing software, the CPU 80 or microcontroller executes a software module that controls the operation of the on-board RF transceivers, 70 and 90. This includes controlling transceiver operations, designating its operational parameters and managing the system's power consumption through precision duty cycling. The RF transceiver control software manages the radar's functionality including parameters such as revisit rates, points to process and signal processing functions. Moreover, the software controls the various operational modes of the RADAR including a low-power surveillance mode that provides active, wide-area search for targets at very low-duty cycles and a higher repetition-rate target report mode that is initiated after an initial detection and supports target verification, classification and tracking. Finally, the control software supports the generation and exfiltration of target reports through the satellite transceiver 90.

C2 protocols also enable the two-way flow of information through the SATCOM architecture. This includes software modules that run on both a HiPer-UGS node and at a remote C2 workstation. As mentioned previously, SATCOM services are commercially available through a number of vendors and such a service is preferably used for the HiPer-UGS architecture. A preferred C2 workstation includes advanced visualization technologies and a C2 user interface that enables remote control of nodes operating in the field. Preferred control functions also include on/off, diagnostic readings, such as battery life, temperature, etc.

Concept of Operations

The HiPer-UGS system concept comprises a highly integrated and sophisticated, low-power RADAR-based ground sensor that provides the capability to detect, classify and track both personnel and vehicles in near real-time (see FIG. 1). Due to their expected small size, HiPer-UGS is easily emplaced in difficult areas using airborne assets, such as Unmanned Aerial Vehicles (UAVs), or delivered by hand using military or security personnel. Moreover, since node-to-node communications and networking are not necessary, deployment is very simple and reliable. Once deployed and activated, an individual HiPer-UGS radar-node 10 has direct network connection with a remote Command and Control (C2) unit through a SATCOM link. Using a novel electronically steerable phased array antenna 20 and a high-resolution radar waveform, the HiPer-UGS node scans a radar beam at revisit rates consistent with the velocities of targets of interest. Real-time radar signal processing algorithms, including a target detector and classifier, generates precision target detection, classification and tracking information that are be included in a detailed target report. These target reports are buffered on the node's microprocessor and transmitted using an in-node satellite transceiver to the C2 unit for display and analysis.

The HiPer-UGS approach to ground sensing provides many benefits over conventional wireless sensor networking technologies. These benefits will have a tremendous impact on the operational utility of the system and the operator's ability to generate real-time situational awareness. The utilization of high precision monostatic phased array radar 20 will provide significantly improved performance over conventional approaches that leverage acoustic, seismic, or electromagnetic-based sensing. This approach to false alarm reduction and target identification will significantly improve the operation utility of information generated from ground sensor systems.

The incorporation of node-level SATCOM capabilities will significantly reduce the amount of time necessary for exfiltrating target reports to the operator. Research on a number of government sponsored networked UGS programs has demonstrated significant delays in exfiltrating target reports that are generated in a distributed sensor network. These networks normally operate using a Time Division Multiple Access (TDMA) approach that requires data to be transmitted through the network on a transmit and receive schedule. These delays can be on the order of several minutes and result in target information that is outdated or no longer relevant to an operator or analyst.

To provide the long endurance necessary to make HiPer-UGS systems operationally effective requires a hardware architecture that consumes very low power in a sleep mode and is power managed such that the power spikes required for communications and high-signal processing loads can be accommodated. The HiPer-UGS concept includes power supplied by a combination of batteries and energy scavengers, such as High Efficiency Photovoltaic Cells (HEPVs) designed to meet the power requirements for all node functions and, thus, provide persistent system operation. A highly integrated System-on-a-Chip (SoC) architecture including the RADAR transceiver and digital processing is based on the use of clockless technology that is being supported by the Defense Advanced Research Projects Agency (DARPA) Clockless Logic, Analysis, Synthesis and Systems (CLASS) program. This technology provides ultra-low power, with on-demand data driven processing and also provides very low noise/Electromagnetic Interference (EMI) that reduces crosstalk with the on-chip sensors and Radio Frequency (RF) circuits and can operate robustly across varying power supply voltages.

Without the requirement for node-to-node communications and networking, HiPer-UGS enables highly robust and quick emplacement either by hand or air deployment. Traditional networked UGS require highly complex deployment schemes to ensure that node-to-node communication link budgets are supported. If emplacement errors from air deployment are significant, large portions of the network could be rendered inoperable and critical exfiltration routes to external long-haul or SATCOM relay devices could be broken. Moreover, large variations in terrain elevation could result in sever limitations in node-to-node spacing due to non-line of sight issues.

Unlike conventional networked UGS, HiPer-UGS networks has no single point of failure as each node has the ability to directly relay target reports to the analyst through a SATCOM architecture. HiPer-UGS radar-nodes 10 operates independently; therefore, the failure of other nodes within the local network may introduce RADAR coverage gaps, but does not result in the breakdown of the network.

As to a further discussion of the construction and operation of the methods of present invention, the same should be apparent from the above description. Accordingly, no further discussion relating to the manner of usage and operation will be provided. With respect to the above description then, it is to be realized that the optimum variables for the disclosed methods or uses of the compositions of the invention, to include variations in time, size, materials, shape, form, function and manner of operation, and use, are deemed readily apparent and obvious to one skilled in the art, and all equivalent relationships to those illustrated in the figures and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention

The invention claimed is:
1. A radar device comprising,
an phased array antenna, that is electronically steerable, for receiving radar target information electrically coupled to;
a radar transceiver electrically connected to the phased array antenna;
a central processing unit, operatively connected to the radar transceiver, the central processing unit operating a computer program to (i) generate target characteristics including target tracking by a time domain filter that compares radar target information to previous radar target information within a scan matrix comprised of radar target information indexed by radar range, azimuth, and instance and a clutter matrix comprised of background radar target information indexed by radar range, azimuth, and instance, and (ii) communicate the target characteristics to;
a communications transceiver electrically coupled to a L-band antenna; and
a battery electrically coupled to the central processing unit.
2. The time domain filter in claim 1 further comprises,
a threshold matrix comprised of user influenced data indexed by radar range, azimuth, and instance.
3. The time domain filter in claim 2 wherein,
the user influenced data in the threshold matrix is also based on clutter motion.

\* \* \* \* \*